United States Patent [19]

Spalink et al.

[11] Patent Number: 4,892,117
[45] Date of Patent: Jan. 9, 1990

[54] REFRIGERATION COUPLING

[75] Inventors: Robert D. Spalink, Jackson; Steven M. Knowles, Leslie; John T. Kusztowny, Ann Arbor, all of Mich.

[73] Assignee: Aeroquip Corporation, Jackson, Mich.

[21] Appl. No.: 269,729

[22] Filed: Nov. 10, 1988

[51] Int. Cl.⁴ .............................................. F16L 29/00
[52] U.S. Cl. ................................................ 137/614.03
[58] Field of Search .................................... 137/614.03

[56] References Cited

U.S. PATENT DOCUMENTS

| | | | |
|---|---|---|---|
| 2,850,298 | 9/1958 | Clark | 137/614.03 |
| 3,910,312 | 10/1975 | Weinbold | 137/614.03 |
| 4,287,914 | 9/1981 | Bureth et al. | 137/614.03 |

Primary Examiner—John Fox
Attorney, Agent, or Firm—Beaman & Beaman

[57] ABSTRACT

The invention relates to refrigeration couplings and more specifically to an improved valve construction for maximizing fluid flow in a small diameter coupling with a minimum of pressure loss. The invention incorporates a quick assembly of internal parts which are removable for repair and changing of the sealing rings which are used in the self-sealing valves.

1 Claim, 1 Drawing Sheet

REFRIGERATION COUPLING

BACKGROUND OF THE INVENTION

Couplings are widely used in fluid circuits. The construction of these fluid couplings generally include self-sealing valves and ball release sleeves for quick disconnect and can be found in many different sizes for attaching to various processing lines and fluid circuits. Devices of this type are shown in U.S. Pat. Nos. 2,709,093; 2,739,374 and 2,765,181.

Pressure loss within fluid couplings occurs as the medium flows through restrictions in the couplings, such as between the valve seal and its associated seat, and previously, a fluid coupling of concise dimensions has not been available for use in refrigeration circuits wherein the coupling parts are releasable and reconnectable and where low pressure losses are attained.

An object of the invention is to provide a concise coupling with a self-sealing valve that has a maximum flow opening for low flow resistance. Large flow openings are achieved by the configuration of the coupling passage adjacent the valve seal.

Another object of the invention is to provide an improved coupling in which the self-sealing valves include an O ring which engages a cylindrical sealing surface and whereby the construction incorporates an assembly of parts that are easily removable for replacing of the O rings.

A further object of the invention is to provide a coupling having spring biased self-closing valves wherein the spring forces are not used to displace the valve of the other coupling part as in the usual case but, rather a fixed part in one coupling part is used to open the opposing coupling parts valve as the parts are coupled.

In the practice of the invention one of the coupling parts is attached to evacuation or charging lines, while the other coupling part is attached to a refrigeration circuit. The coupling parts utilize standard interconnecting means in which, an annular sleeve mounted on the female part supports radially displaced detent balls that engage in a recess in the male part and lock into position.

The self-sealing valve assemblies within the male and female parts each engage a fixed member of the opposing part to open when fully coupled. Each valve has a compression spring biasing it to the closed position thereby sealing automatically during uncoupling.

The self-sealing valve assemblies are constructed so that when the parts are in the coupled position a large flow opening is produced having a low flow resistance. Such large flow openings in the concise coupling are accomplished by the configuration of the passage adjacent the O ring seals.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
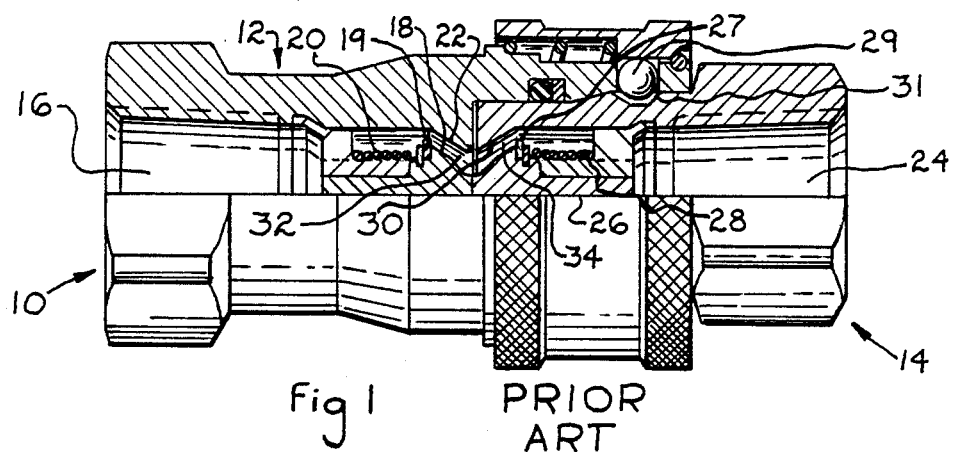
FIG. 1 is an elevational view, partially in section, of a prior art coupling assembly shown in the coupled position.

In a typical prior art coupling 10 as shown in FIG. 1, 12 indicates a female part and 14 a male part. The female part 12 has an axial passage 16 wherein a spring biased self-sealing valve 18 is located that is axially moveable between the open and closed positions. The valve 18 carries a sealing ring 19 and is biased to the closed position by the action of a spring 20 whereby the sealing ring 19 engages the valve seat 22 sealing the axial passage 16. Similarly, the male part 14 has an axial passage 24 wherein a spring biased self closing valve 26 is located that is axially moveable between the open and closed positions. The valve 26 carries a sealing ring 27 and is biased to the closed position by the action of spring 28 whereby, the sealing ring 27 engages the valve seat 30 sealing the axial passage 24. When the parts 12 and 14 are coupled upon detent balls 29 being received within the recess 31, valves 18 and 26 engage and displace each other to the opened position producing flow openings 32 and 34 adjacent to the sealing rings 19 and 27, respectively, and placing the passages 16 and 24 in fluid communication. If one of the spring forces is weak there is a possibility that one of the valves would not open fully. When the valves 18 and 26 open the flow openings 32 and 34 are small compared to the diameter of the passages, producing high flow resistance in the coupling 10.

Figure 2:
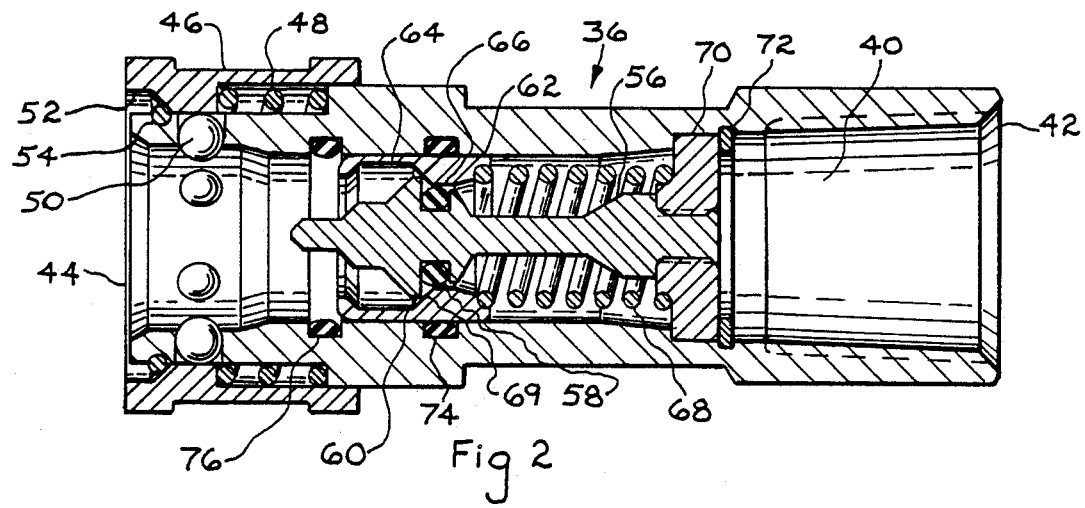
FIG. 2 is a sectional view of a female coupling body part in accord with the invention.
Figure 3:
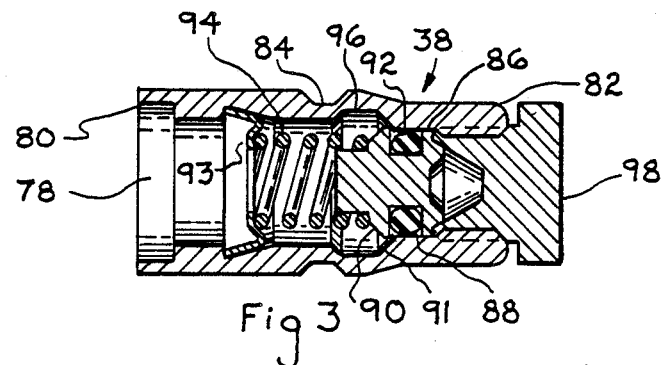
FIG. 3 is a sectional view of a male coupling body part.
Figure 4:
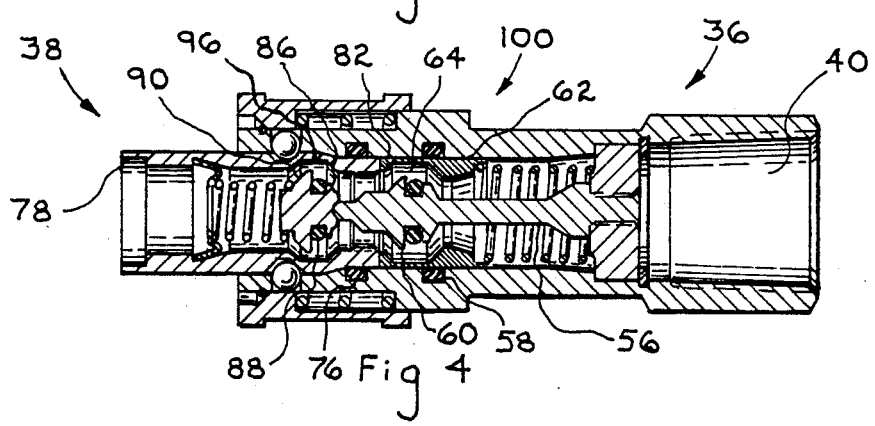
FIG. 4 is a sectional view of the coupling body parts in the coupled position showing the self-sealing valves in the open positions.

The invention is disclosed in FIGS. 2–4 wherein 36 indicates the female coupling body part and 38 the male coupling body part, each part having an axial passage, and an inner end for connecting to their respective fluid conductors, not shown.

The female part 36 has a cylindrical axial passage 40 and an inner end 42 for attaching to evacuation or charging lines, not shown. The other end presents an opening 44 and has a sleeve 46 that is moveable by an applied force in the axial direction. The sleeve 46, biased to the closed position by a compression spring 48, supports radially displacable detent balls 50 and has a counter bore 52 that frees the balls 50 when the sleeve 46 is in the open position. Ring 54 contains the balls in the counter bore 52 when the sleeve 46 is in the open position. A coaxial probe 56 is located within the axial passage 40 having a annular sealing ring 58 adjacent a maximum diameter step 60 for engaging the interior of an axially slidable spring biased valve sleeve 62.

The valve sleeve 62 is slidable within the female passage 40 circumscribing the probe 56. An annular recess 64 on the interior cylindrical surface of the valve sleeve 62 has a maximum diameter adjacent the cylindrical valve seat 66. The valve sleeve 62 is urged to its closed position by the coil spring 68 wherein the valve seat 66 receives the sealing ring 58 producing a sealed relationship. The step 60 on the probe 56 limits movement of the valve 62 in the passage 40 by engaging the conical surface 69. A spider 70, held in place by a ring 72, is used to hold the probe 56 in axial alignment with the valve sleeve 62 and also serves as a support for the spring 68. A sealing ring 74 on the interior of the female body 36 maintains a fluid seal with respect to the outer surface of the valve sleeve 62. Another sealing ring 76 on the interior of the female body 36 maintains a fluid seal with respect to the outer surface of the male body 38 when in the coupled position.

The male body part 38, has an axial passage 78, an inner end 80 for attaching to a refrigeration unit conduit, not shown, and an extension end 82 capable of being introduced axially into the female opening 44 to couple the two body parts together by a locking engagement of the detent balls 50 in an annular recess 84 defined on the exterior of the male body part 38.

A valve assembly, located in the male passage 78, comprises a spring biased cylindrical valve 86 that is slidable between the open and closed positions and carries an annular sealing ring 88 adjacent a maximum diameter step 90. The valve 86 is normally forced to the closed position by the action of a spring 94, where the sealing ring 88 is received within the cylindrical seat 92 that is adjacent the maximum diameter of an annular recess 96. Movement of the valve 86 is limited in the passage 78 by the engagement of the valve step 90 with the conical surface 91. The spring 94 is supported at one end by a spider locater 93 that enables the spring 94 to maintain the valve 86 in axial alignment with the passage 78. A cap 98 can be temporarily inserted into the extension end 82 to prevent foreign matter from entering the male part.

To connect the two coupling body parts 36 and 38 together it is merely necessary to insert the male extension end 82 into the female opening 44. By holding the female part 36 in one hand and pulling the sleeve 46 in an axial direction away from the opening 44 the balls 50 may be displaced radially. Sliding the female opening 44 continues over the male extension end 82 until movement is limited and release the sleeve 46 occurs, whereupon the stressed spring 48 retracts closing the sleeve 46 and causing the detent balls 50 to engage the recess 84 on the male body 38 coupling the body parts 36 and 38 together. The coupled position of the body parts is indicated by the coupling 100, shown in FIG. 4. During coupling, the male extension end 82 engages and displaces the female valve sleeve 62 and simultaneously the female probe 56 engages and displaces the male valve 86. This will cause the valves 62 and 86 to be moved to the opened position against the action of their springs 68 and 94, respectively. Opening of the valves 62 and 86 places the axial passages 40 and 78 in fluid communication. It should be noted that this method of opening the valves 62 and 86 is independent of spring forces unlike the valves 18 and 26 in the prior art coupling 10 as previously discussed.

As will be noted in the coupling 100, when the valves 62 and 86 are in the opened position, the maximum diameter of the annular recess 64 on the valve sleeve 62 is radially aligned with the maximum diameter step 60 and the seal ring 58 on the female probe 56, and the maximum diameter step 90 and the seal ring 88 on the male valve 86 are radially aligned with the maximum diameter of the annular recess 96. This produces large flow openings adjacent the sealing rings 58 and 88 for low flow resistance with a minimum of pressure loss in the coupling 100. To disconnect the coupling 100, the female sleeve 46 is moved in an axial direction away from the male part 38 and at the same time pulling the female part 36 in the same direction will disengage the balls 50 uncoupling the body parts 36 and 38. Simultaneously, the valves 62 and 86 will automatically close by the action of the springs 68 and 94, respectively, sealing the passages 40 and 78 in the uncoupled body parts.

It is appreciated that various modifications to the inventive concepts may be apparent to those skilled in the art without departing from the spirit and scope of the invention.

We claim:

1. A coupling used in the charging and recharging of refrigeration circuits, comprising, in combination, a female part having an axial passage having an inner connection end and an open outer end, a male part having an axial passage having an inner connection end and an outer end adapted to be received within said female part outer end, connection means defined on said parts for selectively coupling said parts' open ends in coaxial communication, a first self-sealing valve within said passage of said male part axially moveable between open and closed positions having a maximum diameter, a first annular sealing ring mounted on said valve adjacent said maximum diameter, said passage of said male part having a cylindrical sealing surface receiving and engaging said first sealing ring in said closed position, an annular recess defined in said male part passage adjacent said cylindrical surface, said first valve maximum diameter being radially aligned with said recess when said first valve is in said open position, a self-sealing valve sleeve within said passage of said female part axially moveable between open and closed positions and having an outer end, an inner cylindrical surface, and an annular recess between said valve outer end and said cylindrical surface, a coaxial probe fixed within said female part passage having a free end extending toward said female part open end and having a maximum diameter, a second annular sealing ring mounted on said probe adjacent said probe maximum diameter, said valve sleeve circumscribing said probe, said probe mounted sealing ring being received within and engaging said valve sleeve cylindrical surface when said valve sleeve is in said closed position, said valve sleeve recess being radially aligned with said probe maximum diameter when said valve sleeve is in said open position, said male and female parts each having releasable connection means for connecting said parts open outer ends to produce an open passage between said parts when fully coupled, a compression coil spring in each said parts biasing each said valve towards its closed position, said male part engaging said valve sleeve outer end and said probe engaging said first valve upon connection of said parts to displace said valve and valve sleeve to their open positions.

* * * * *